United States Patent
Iwasaki et al.

(10) Patent No.: US 9,911,448 B2
(45) Date of Patent: Mar. 6, 2018

(54) PERPENDICULAR MAGNETIC RECORDING MEDIUM, METHOD OF MANUFACTURING THE SAME, AND MAGNETIC RECORDING/REPRODUCTION APPARATUS

(71) Applicant: KABUSHIKI KAISHA TOSHIBA, Minato-ku, Tokyo (JP)

(72) Inventors: Takeshi Iwasaki, Inagi (JP); Kazutaka Takizawa, Fuchu (JP); Akira Watanabe, Kawasaki (JP); Kaori Kimura, Yokohama (JP); Akihiko Takeo, Kunitachi (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 42 days.

(21) Appl. No.: 15/070,733

(22) Filed: Mar. 15, 2016

(65) Prior Publication Data
US 2016/0196847 A1    Jul. 7, 2016

Related U.S. Application Data

(62) Division of application No. 13/553,692, filed on Jul. 19, 2012, now abandoned.

(30) Foreign Application Priority Data

Jan. 16, 2012 (JP) .................................. 2012-006248

(51) Int. Cl.
G11B 5/84    (2006.01)
G11B 5/855   (2006.01)
G11B 5/65    (2006.01)

(52) U.S. Cl.
CPC .................. G11B 5/84 (2013.01); G11B 5/65 (2013.01); G11B 5/855 (2013.01)

(58) Field of Classification Search
CPC .............. G11B 5/84; G11B 5/65; G11B 5/855
See application file for complete search history.

(56) References Cited

U.S. PATENT DOCUMENTS

| 7,601,445 B2 | 10/2009 | Iwasaki et al. |
| 2006/0246323 A1 | 11/2006 | Liu et al. |
| 2008/0182131 A1 | 7/2008 | Iwasaki |
| 2008/0241595 A1 | 10/2008 | Kimura et al. |

(Continued)

FOREIGN PATENT DOCUMENTS

| JP | 2004-272958 | 9/2004 |
| JP | 2005-100537 | 4/2005 |

(Continued)

*Primary Examiner* — Duy Deo
(74) *Attorney, Agent, or Firm* — Knobbe, Martens, Olson & Bear, LLP (57) ABSTRACT

A perpendicular magnetic recording medium according to an embodiment includes a substrate and perpendicular magnetic recording layer. The perpendicular magnetic recording layer includes a recording portion and non-recording portion. The recording portion has patterns regularly arranged in the longitudinal direction, and includes magnetic layers containing Fe or Co and Pt as main components, and at least one additive component selected from Ti, Si, Al, and W. The non-recording portion includes oxide layers formed by oxidizing the side surfaces of the magnetic layers, and non-magnetic layers formed between the oxide layers.

5 Claims, 6 Drawing Sheets (56) References Cited

U.S. PATENT DOCUMENTS

| | | | |
|---|---|---|---|
| 2010/0067141 A1* | 3/2010 | Ishibashi | B82Y 10/00 360/75 |
| 2010/0181984 A1* | 7/2010 | Fukushi | H02M 1/32 323/284 |
| 2010/0232054 A1 | 9/2010 | Mabuchi | |
| 2011/0019308 A1 | 1/2011 | Fukushima | |
| 2011/0181984 A1 | 7/2011 | Okawa et al. | |
| 2013/0182351 A1 | 7/2013 | Iwasaki et al. | |

FOREIGN PATENT DOCUMENTS

| | | |
|---|---|---|
| JP | 2008-159146 | 7/2008 |
| JP | 2010-198728 | 9/2010 |
| JP | 2010-272183 | 12/2010 |
| WO | WO 2009/119829 A1 | 10/2009 |

* cited by examiner

F I G. 14

PERPENDICULAR MAGNETIC RECORDING MEDIUM, METHOD OF MANUFACTURING THE SAME, AND MAGNETIC RECORDING/REPRODUCTION APPARATUS

CROSS-REFERENCE TO RELATED APPLICATIONS

This application is a divisional of U.S. patent application Ser. No. 13/553,692, filed on Jul. 19, 2012, which is based upon and claims the benefit of priority from prior Japanese Patent Application No. 2012-006248, filed Jan. 16, 2012; the entire contents of which are incorporated herein by reference.

FIELD

Embodiments described herein relate generally to a perpendicular magnetic recording medium, a method of manufacturing the same, and a magnetic recording/reproduction apparatus.

BACKGROUND

The need for a high-capacity hard disk drive (HDD) is increasing year by year. A presently prevalent magnetic recording medium has an arrangement in which each layer forming the recording medium is evenly formed on the entire substrate surface. When achieving a recording capacity exceeding 500 Gb/in$^2$, however, adjacent data signals are too close to each other. When recording or reproducing the data signals, therefore, a phenomenon in which nearby data to be neither recorded nor reproduced is read out or written occurs.

Accordingly, patterned media have recently extensively been studied as techniques of further increasing the recording density by avoiding the phenomenon as described above. A patterned medium has the feature that a magnetic film is processed into predetermined patterns in advance, and a recording/reproduction head records or reproduces information in accordance with the patterns. As the forms of the processed patterns, a discrete track medium (DTM) in which only servo information and recording tracks are processed and data is recorded in the circumferential direction by the conventional method and a so-called bit patterned medium (BPM) in which not only servo information but also bit patterns are processed in the circumferential direction have been examined.

Since servo information is preformed on the DTM and BPM as described above, it is possible to shorten the conventionally necessary time for magnetically recording the servo information, and reduce the apparatus cost. Also, no magnetic film exists between tracks or magnetization reversal units (bits), so no noise is generated therefrom. This makes it possible to improve the signal quality (signal/noise ratio: SNR), and manufacture a high-density magnetic recording medium and magnetic recording apparatus.

In the DTM and BPM, however, a magnetic film is processed into fine patterns, so the film may be damaged during the processing. As an example, the oxidation of a magnetic element such as Co may deteriorate the magnetic characteristics of the magnetic film, thereby degrading the recording/reproduction characteristics of the medium.

Accordingly, demands have arisen for a simple process that can be implemented while maintaining the recording/reproduction characteristics.

DETAILED DESCRIPTION

A perpendicular magnetic recording medium according to an embodiment includes a substrate and perpendicular magnetic recording layer.

The perpendicular magnetic recording layer includes a recording portion and non-recording portion.

The recording portion has patterns regularly arranged in the longitudinal direction, and includes a magnetic layer containing a main component made of platinum and one of iron and cobalt, and at least one additive component selected from titanium, silicon, aluminum, and tungsten.

The non-recording portion includes oxide layers formed by oxidizing the side surfaces of the magnetic layers (recording portions), and nonmagnetic layers formed between the oxide layers.

Also, a method of manufacturing the perpendicular magnetic recording medium according to the embodiment includes a step of patterning the perpendicular magnetic recording layer of the perpendicular magnetic recording medium. The step of patterning the perpendicular magnetic recording layer includes a step of forming a mask layer including projections having regularly arranged patterns on the surface of a protective layer of an unprocessed perpendicular magnetic recording medium, a step of forming a protective layer and magnetic layer having the regularly arranged patterns by performing etching through the mask layer, a step of forming oxide layers by oxidizing the side surfaces of the magnetic layers (recording portions), a step of removing the mask layer, and a step of performing planarization by forming nonmagnetic layers between the oxide layers. The unprocessed perpendicular magnetic recording medium includes a substrate, a magnetic layer formed on the substrate and containing a main component made of platinum and one of iron and cobalt, and at least one additive component selected from titanium, silicon, aluminum, and tungsten, and a protective layer formed on the magnetic layer.

Furthermore, a magnetic recording/reproduction apparatus according to an embodiment includes the above-mentioned perpendicular magnetic recording medium, a mechanism for supporting and rotating the perpendicular magnetic recording medium, a magnetic head including an element for recording information on the perpendicular magnetic recording medium, and an element for reproducing the recorded information, and a carriage assembly supporting the magnetic head so that the magnetic head can freely move relative to the perpendicular magnetic recording medium.

An embodiment will be explained below with reference to the accompanying drawings.

Figure 1:
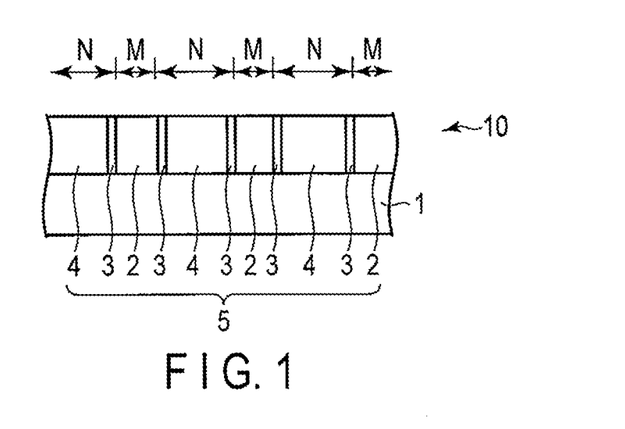
FIG. 1 is a view showing an example of the arrangement of a perpendicular magnetic recording medium according to an embodiment.

FIG. 1 is a view showing an example of the arrangement of a perpendicular magnetic recording medium according to the embodiment.

As shown in FIG. 1, a perpendicular magnetic recording medium 10 includes a substrate 1, and a magnetic recording layer 5 formed on the substrate 1. The magnetic recording layer 5 includes oxide layers 3 formed by oxidizing the side surfaces of magnetic layers having patterns regularly arranged in the longitudinal direction and containing a main component made of platinum and one of iron and cobalt and at least one additive component selected from titanium, silicon, aluminum, and tungsten, unoxidized magnetic layers 2, and nonmagnetic layers 4 formed between the oxide layers 3. In the magnetic recording layer 5, the unoxidized magnetic layers 2 form recording portions M, and the oxide layers 3 and nonmagnetic layers 4 form non-recording portions N.

Figure 2:
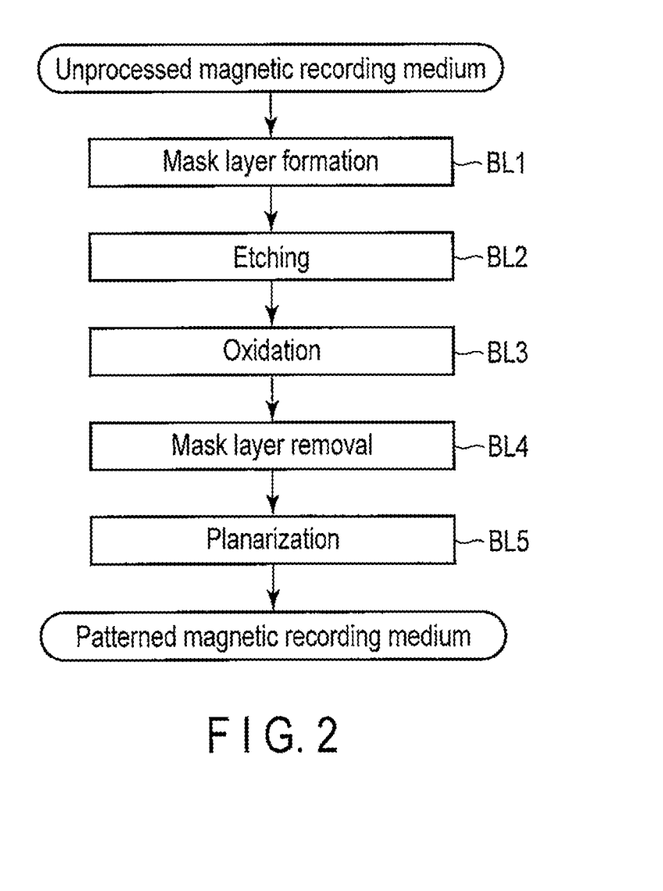
FIG. 2 is a flowchart showing examples of manufacturing steps of the perpendicular magnetic recording medium shown in FIG. 1.

FIG. 2 is a flowchart showing examples of manufacturing steps of the perpendicular magnetic recording medium shown in FIG. 1.

As shown in FIG. 2, as an unprocessed perpendicular magnetic recording medium, a stack including a substrate, a magnetic layer formed on the substrate and containing a main component made of platinum and one of iron and cobalt and at least one additive component selected from titanium, silicon, aluminum, and tungsten, and a protective layer formed on the magnetic layer is first prepared.

Then, a mask layer including projections having regularly arranged patterns is formed on the surface of the protective layer of the unprocessed perpendicular magnetic recording medium (BL1). After that, the protective layer and magnetic layer having the regularly arranged patterns are formed by performing etching through the mask layer (BL2). Subsequently, oxide layers are formed by oxidizing the side surfaces of the magnetic layers (BL3). After that, the mask layer is removed (BL4). Then, planarization is performed by forming nonmagnetic layers between the oxide layers (BL5). The patterned perpendicular magnetic recording medium is thus obtained.

Substrate

As the substrate, it is possible to use, e.g., a glass substrate, an Al-based alloy substrate, a ceramic substrate, a carbon substrate, or an Si single-crystal substrate having an oxidized surface. Examples of the glass substrate are amorphous glass and crystallized glass. Examples of the amorphous glass are general-purpose soda lime glass and aluminosilicate glass. An example of the crystallized glass is lithium-based crystallized glass. Examples of the ceramic substrate are general-purpose sintered products mainly containing aluminum oxide, aluminum nitride, and silicon nitride, and fiber reinforced products of these sintered products. As the substrate, it is also possible to use a substrate obtained by forming an NiP layer on the surface of any of the metal substrates and non-metal substrates described above by using plating or sputtering. As a method of forming a thin film on the substrate, it is also possible to use vacuum deposition or electroplating as well as sputtering.

Nonmagnetic Under Layer

A nonmagnetic under layer can be formed on the nonmagnetic substrate. The nonmagnetic under layer is formed in contact with the perpendicular magnetic recording layer, and can control the crystal alignment and crystal grain size of the perpendicular magnetic recording layer. As the nonmagnetic under layer, it is possible to use any of an Ru alloy, Ni alloy, Pt alloy, Pd alloy, Ta alloy, Cr alloy, Si alloy, and Cu alloy. The film thickness of the nonmagnetic under layer can be set to 1 to 20 nm. If the film thickness of the nonmagnetic under layer is less than 1 nm, the effect as an alignment controlling layer becomes insufficient, and the crystal alignment worsens. Also, if the film thickness of the nonmagnetic under layer exceeds 20 nm, a spacing loss occurs. Furthermore, the nonmagnetic under layer can be formed by a single layer or a plurality of layers.

Magnetic Layer

The magnetic layer used in the perpendicular magnetic recording layer can contain a main component made of platinum and one of iron and cobalt, and at least one additive component selected from titanium, silicon, aluminum, and tungsten.

The addition amount of the additive component can be set within the range of 5 to 20 at % with respect to the whole composition of the magnetic layer. Note that the content of an element used as the main component with respect to the whole composition of the magnetic layer is larger than that of an element used as the additive component.

When the addition amount of the additive component falls within the above range, the Ku of the magnetic grains does not decrease too much, and high magnetization is maintained. Consequently, recording/reproduction characteristics suited to high-density recording and sufficient thermal decay characteristics are obtained. If the addition amount of the additive component exceeds 20 at %, the thermal decay characteristics worsen because the Ku of the magnetic grains decreases. Since the saturation magnetization (Ms) of the perpendicular magnetic recording layer also reduces, the reproduced output deteriorates. At the same time, the crystallinity and alignment of the magnetic grains worsen, and as a consequence the recording/reproduction characteristics degrade. If the addition amount of the additive component is less than 5 at %, the addition amount is too small, so no uniform oxide film can be formed because the thickness of the film is small. This makes it impossible to reduce damage during removal.

The thickness of the perpendicular magnetic recording layer can be set within the range of 3 to 30 nm, particularly, 5 to 15 nm. When the thickness falls within this range, it is possible to manufacture a magnetic recording/reproduction apparatus more suitable for a high recording density. If the thickness of the perpendicular magnetic recording layer is less than 3 nm, the reproduced output is too low, and the noise component becomes higher. If the thickness of the perpendicular magnetic recording layer exceeds 30 nm, the reproduced output becomes too high and distorts the waveform. The perpendicular magnetic recording layer can also be a multilayered film including two or more layers. In this case, the total thickness of the stacked layers can be set within the above-described range. The coercive force of the perpendicular magnetic recording layer can be set to 237,000 A/m (3,000 Oe) or more. If the coercive force is less than 237,000 A/m (3,000 Oe), the thermal decay resistance decreases. The perpendicular squareness ratio of the perpendicular magnetic recording layer can be set at 0.8 or more. If the perpendicular squareness ratio is less than 0.8, the thermal decay resistance decreases.

The Pt content of the perpendicular magnetic recording layer can be set within the range of 10 to 25 at %.

When the Pt content falls within the above range, a uniaxial magnetocrystalline anisotropy constant (Ku) necessary for the perpendicular magnetic recording layer is obtained, and the crystal alignment of the magnetic grains improves. Consequently, thermal decay characteristics and recording/reproduction characteristics suited to high-density recording are obtained. If the Pt content exceeds 25 at % or is less than 10 at %, it is impossible to obtain thermal decay characteristics suitable for high-density recording and a sufficient Ku.

Furthermore, the perpendicular magnetic recording layer can also include a plurality of stacked films. In this case, the above-mentioned additive component can be added to all or some of the stacked films.

Protective Film

The protective film can be formed on the perpendicular magnetic recording layer in order to prevent the corrosion of the perpendicular magnetic recording layer, and prevent damages to the medium surface when a magnetic head comes in contact with the medium. Examples of the material of the protective film are materials containing C, $SiO_2$, and $ZrO_2$.

The thickness of the protective film can be set to 1 to 10 nm. This thickness makes high-density recording feasible because the distance between the head and medium can be decreased. Carbon can be classified into $sp^2$-bonded carbon (graphite) and $sp^3$-bonded carbon (diamond). $Sp^3$-bonded carbon is superior in durability and corrosion resistance, but inferior to graphite in surface smoothness because diamond is crystalline. A carbon film is normally formed by sputtering using a graphite target. This method forms amorphous carbon containing both $sp^2$-bonded carbon and $sp^3$-bonded carbon. Amorphous carbon having a high $sp^3$-bonded carbon ratio is called diamond-like carbon (DLC). DLC is superior in durability and corrosion resistance, and also superior in surface smoothness because it is amorphous. Therefore, DLC can be used as a surface protective film of a magnetic recording medium. In the deposition of DLC performed by CVD (Chemical Vapor Deposition), DLC is generated by a chemical reaction by exciting and decomposing a source gas in plasma. Therefore, it is possible to form DLC rich in $sp^3$-bonded carbon by matching the conditions.

Adhesion Layer and Soft Under Layer

An adhesion layer and soft under layer can further be formed between the nonmagnetic substrate and nonmagnetic under layer.

The adhesion layer is formed to improve the adhesion to the substrate. As the material of the adhesion layer, it is possible to use Ti, Ta, W, Cr, Pt, an alloy containing any of these elements, or an oxide or nitride of any of these elements.

The soft under layer (SUL) horizontally passes a recording magnetic field from a single-pole head for magnetizing the perpendicular magnetic recording layer, and returns the magnetic field toward the magnetic head, i.e., performs a part of the function of the magnetic head. The soft under layer has a function of applying a steep sufficient perpendicular magnetic field to the magnetic field recording layer, thereby increasing the recording/reproduction efficiency. A material containing Co, Fe, or Ni can be used as the soft under layer. Examples of the material are Co alloys containing Co and at least one of Zr, Hf, Nb, Ta, Ti, and Y. The Co alloy can contain 80 at % or more of Co. When the Co alloy like this is deposited by sputtering, an amorphous layer readily forms. The amorphous soft magnetic material has none of magnetocrystalline anisotropy, a crystal defect, and a grain boundary, and hence has very high soft magnetism and can reduce the noise of the medium. Examples of the amorphous soft magnetic material are CoZr-, CoZrNb-, and CoZrTa-based alloys. Other examples of the soft under layer material are CoFe-based alloys such as CoFe and CoFeV, FeNi-based alloys such as FeNi, FeNiMo, FeNiCr, and FeNiSi, FeAl-based and FeSi-based alloys such as FeAl, FeAlSi, FeAlSiCr, FeAlSiTiRu, and FeAlO, FeTa-based alloys such as FeTa, FeTaC, and FeTaN, and FeZr-based alloys such as FeZrN. It is also possible to use a material having a microcrystalline structure or a granular structure in which fine crystal grains are dispersed in a matrix. Examples are FeAlO, FeMgO, FeTaN, and FeZrN containing 60 at % or more of Fe.

Furthermore, in order to prevent spike noise, it is possible to divide the soft under layer into a plurality of layers, and insert a 0.5- to 1.5-nm thick nonmagnetic dividing layer, thereby causing antiferromagnetic coupling. In this case, it is possible to use, e.g., Ru, an Ru alloy, Pd, Cu, or Pt. The soft magnetic layer may also be exchange-coupled with a hard magnetic film having in-plane anisotropy such as CoCrPt, SmCo, or FePt, or a pinned layer made of an antiferromagnetic material such as IrMn or PtMn. To control the exchange coupling force, it is possible to stack magnetic films (e.g., Co) or nonmagnetic films (e.g., Pt) on the upper and lower surfaces of the nonmagnetic dividing layer.

Release Layer, Release Solution, and Release Gas

To remove an excess mask remaining after the recording layer is processed, a release layer can directly be formed on, e.g., the unprocessed magnetic recording medium before the mask layer is formed.

A release solution and release gas can be used to remove the release layer.

The release layer can freely be selected in accordance with the release solution or release gas. An acid, alkali, or the like can be used as the release solution. As an acid, it is possible to use, e.g., a hydrogen peroxide solution ($H_2O_2$), hydrochloric acid, nitric acid, or phosphoric acid. As an alkali, it is possible to use, e.g., NaOH, KOH, or ammonia water. $O_2$, ozone, or the like can be used as the release gas.

When using an acid or alkali as the release solution, a metal that readily dissolves in the acid or alkali or an alloy of the metal can be selected as the release layer. Examples of the metal are Mo, W, Ge, V, and Al. When using $O_2$ as the release gas, a C layer or the like removable by $O_2$ can be used. If the effect of the release solution or release gas is too strong, the recording portions (recording dots) are excessively damaged. On the other hand, if the effect is too weak, the removal time prolongs, and the productivity decreases. For example, an acid can be used at a concentration of about 0.1% to 10%.

Mask Layer

As the mask layer, it is possible to use, e.g., carbon, tantalum, silicon, or nickel.

Center-to-Center Distance (Dot Pitch) of Recording Portions

BPM patterns to be used to pattern the perpendicular magnetic recording layer can freely be selected in accordance with the necessary recording density. More specifically, the center-to-center distance (dot pitch) between adjacent recording portions (recording dots) can be set to 10 to 30 nm. If the dot pitch is larger than 30 nm, the processability improves, but the density of the perpendicular magnetic recording medium cannot be increased. If the dot pitch is less than 10 nm, the processability deteriorates, and the productivity decreases. In addition, the thermal decay resistance of the recording portions (recording dots) decreases, and a phenomenon in which signals partially disappear at room temperature occurs.

Figure 3:
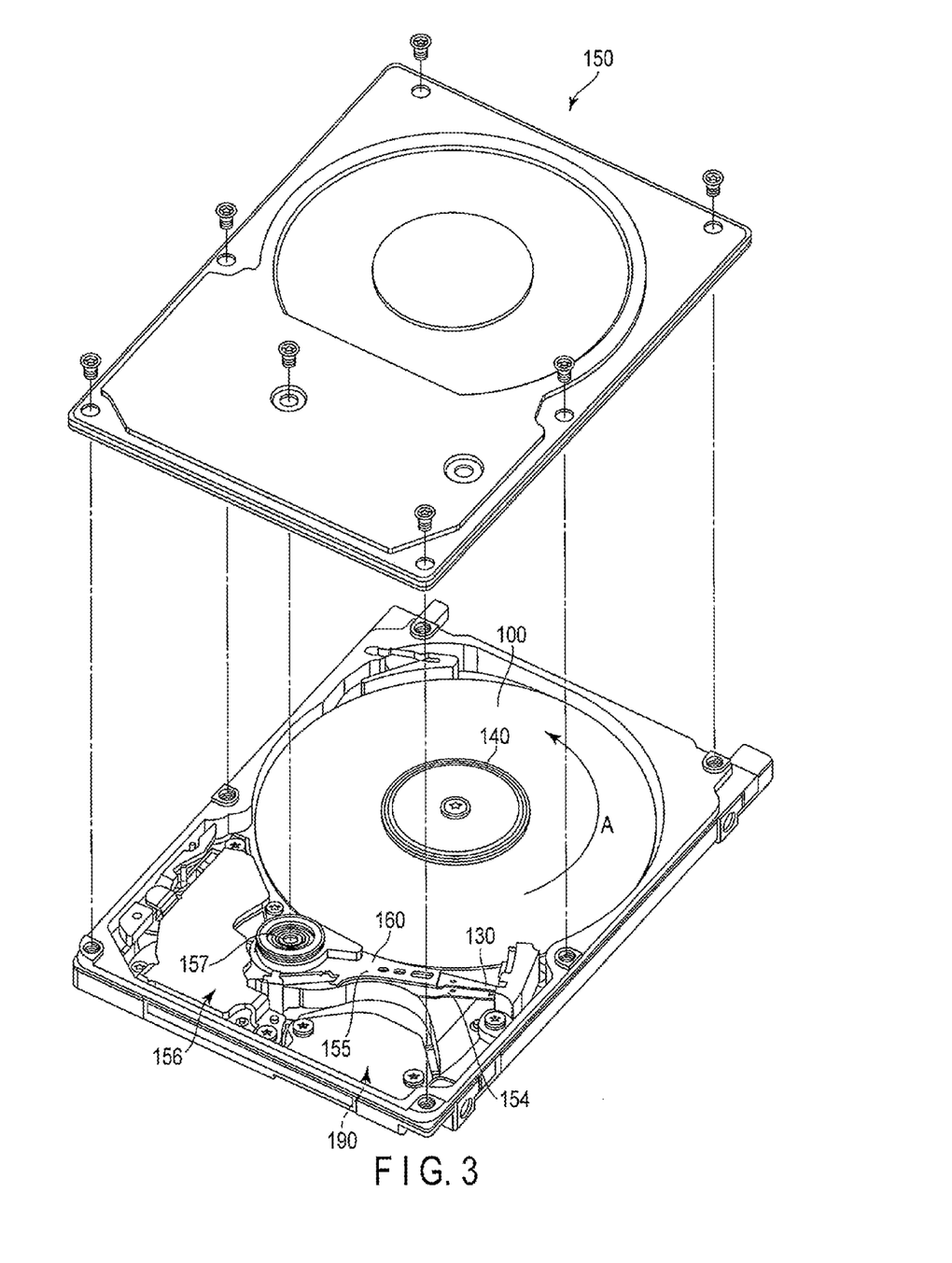
FIG. 3 is a perspective view showing a magnetic recording apparatus incorporating the magnetic recording medium according to the embodiment.

FIG. 3 is a perspective view showing a magnetic recording apparatus incorporating the magnetic recording medium according to the embodiment.

As shown in FIG. 3, a magnetic recording apparatus 150 according to the embodiment is an apparatus using a rotary actuator. A patterned medium 100 is mounted on a spindle motor 140, and rotated in the direction of an arrow A by a motor (not shown) that responds to a control signal from a driver controller (not shown). The magnetic recording apparatus 150 may also include a plurality of patterned media 100.

A head slider 130 for performing information recording/reproduction for the patterned medium 100 is attached to the distal end of a thin-film suspension 154. A magnetic head is formed near the distal end of the head slider 130. When the patterned medium 100 rotates, the pressing force of the suspension 154 balances with the pressure generated by the medium opposing surface (ABS) of the head slider 130. Consequently, the medium opposing surface of the head slider 130 is held with a predetermined floating amount from the surface of the patterned medium 1.

The suspension 154 is connected to one end of an actuator arm 155 including a bobbin for holding a driving coil (not shown). A voice coil motor 156 as a kind of a linear motor is formed at the other end of the actuator arm 155. The voice coil motor 156 can be formed by the driving coil (not shown) wound on the bobbin of the actuator arm 155, and a magnetic circuit including a permanent magnet and counter yoke arranged to oppose each other so as to sandwich the coil. The actuator arm 155 is held by ball bearings (not shown) formed in two, upper and lower portions of a pivot 157, and can freely be rotated and slid by the voice coil motor 156. As a consequence, the magnetic head can access an arbitrary position on the patterned medium 100.

EXAMPLES

Example 1

FIGS. 4, 5, 6, 9, 10, 11, 12, 13, and 14 are exemplary sectional views showing manufacturing steps of a perpendicular magnetic recording medium according to Example 1.

Figure 4:
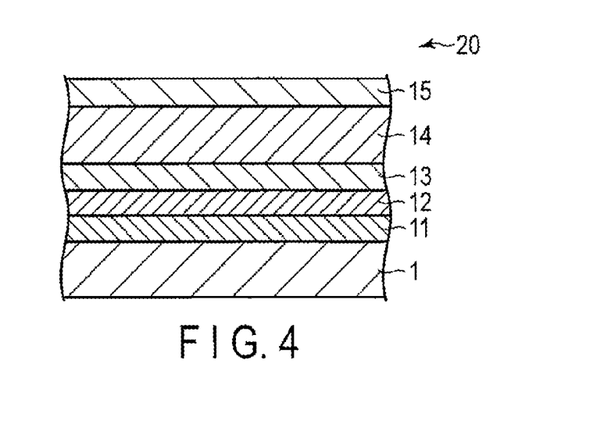
FIG. 4 is an exemplary sectional view showing a manufacturing step of a perpendicular magnetic recording medium according to an embodiment.

A glass substrate 1 (amorphous substrate MEL6 available from KONICA MINOLTA, diameter=2.5 inches) was placed in a deposition chamber of a DC magnetron sputtering apparatus (C-3010 available from CANON ANELVA), and the deposition chamber was evacuated to an ultimate vacuum degree of $1 \times 10^{-5}$ Pa. As shown in FIG. 4, 10-nm thick CrTi was formed as an adhesion layer 11 on the substrate 1. Then, a soft magnetic layer 12 was formed by depositing 40-nm thick CoFeTaZr. 10-nm thick Ru was formed as a nonmagnetic under layer 13. After that, 10-nm thick Co-20 at % Pt-10 at % Ti was formed as an unprocessed magnetic layer 14. Then, a 2-nm thick DLC protective layer 15 was formed by CVD, thereby obtaining an unprocessed perpendicular magnetic recording medium 20.

Figure 5:
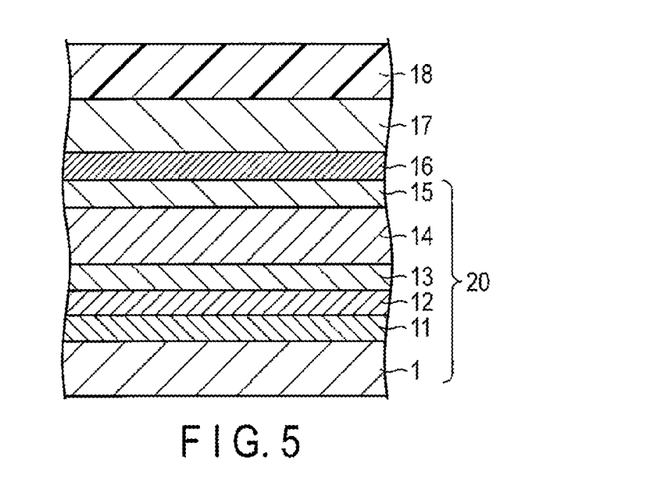
FIG. 5 is an exemplary sectional view showing a manufacturing step of the perpendicular magnetic recording medium according to the embodiment.

Subsequently, as shown in FIG. 5, a 5-nm thick Mo film was formed as a release layer 16 on the surface of the protective layer 15, a 30-nm thick C film was formed as a mask layer 17, and this C mask layer was spin-coated with a 50-nm thick SOG (Spin-On-Glass) resist 18.

Figure 6:
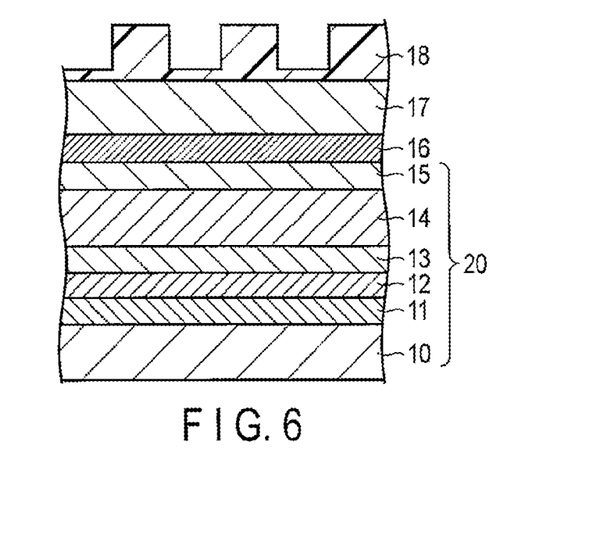
FIG. 6 is an exemplary sectional view showing a manufacturing step of the perpendicular magnetic recording medium according to the embodiment.

Then, a stamper (not shown) having predetermined three-dimensional patterns so designed that the dot pitch was 20 nm and the dot diameter was 15 nm was prepared. This stamper was manufactured through EB lithography, Ni electroforming, and injection molding. The stamper was set such that the three-dimensional surface opposed the SOG resist 18. The stamper was then imprinted on the SOG resist, thereby transferring the three-dimensional patterns of the stamper to the SOG resist 18 as shown in FIG. 6. After that, the stamper was removed.

Figure 7:
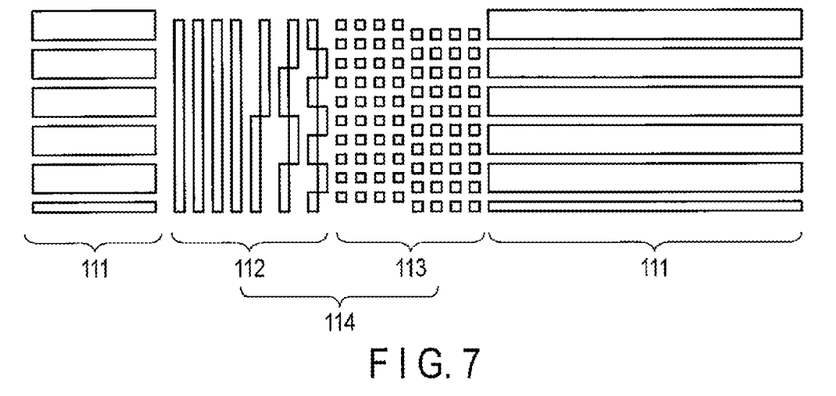
FIG. 7 is a front view showing examples of three-dimensional patterns for a DTM.
Figure 8:
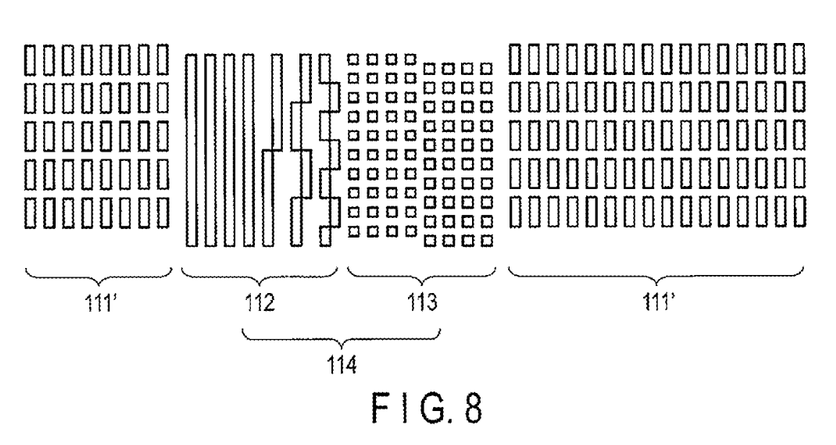
FIG. 8 is a front view showing examples of three-dimensional patterns for a BPM.

FIGS. 7 and 8 are front views respectively showing, as the aforementioned three-dimensional patterns, examples of DTM three-dimensional patterns in which recording tracks and information for positioning a recording/reproduction head are recorded, and examples of BPM three-dimensional patterns in which recording bits and information for positioning a recording/reproduction head are recorded.

Examples of the above-mentioned EB lithography patterns are patterns corresponding to track patterns 111 formed in a data area and servo area patterns 114 formed in a servo area and including preamble address patterns 112 and burst patterns 113 as shown in FIG. 7, or patterns corresponding to bit patterns 111' formed in the data area and the servo area patterns 114 formed in the servo area and including the preamble address patterns 112 and burst patterns 113 as shown in FIG. 8.

Note that the BPM was manufactured in this example.

Figure 9:
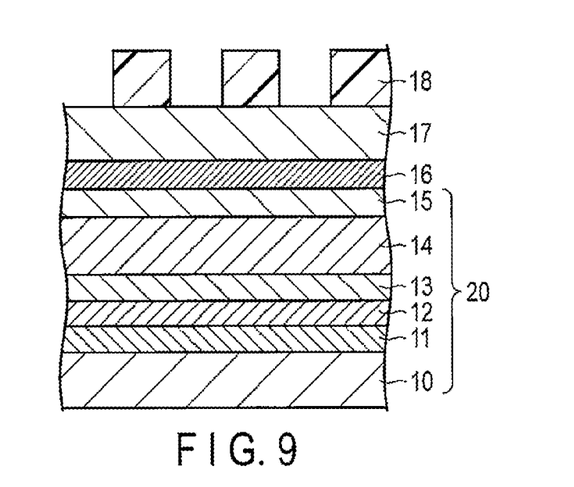
FIG. 9 is an exemplary sectional view showing a manufacturing step of the perpendicular magnetic recording medium according to the embodiment.

The SOG resist residue remained on the bottoms of recesses of the three-dimensional patterns transferred to the SOG resist 18. Therefore, dry etching was performed for an etching time of 60 sec by an inductively coupled plasma-reactive ion etching (ICP-RIE) apparatus by using $CF_4$ as a process gas at a chamber pressure of 0.1 Pa, a coil RF power of 100 W, and a platen (bias) RF power of 50 W, thereby removing the resist residue in the recesses and exposing the surface of the C mask layer 17 to the recesses as shown in FIG. 9.

Figure 10:
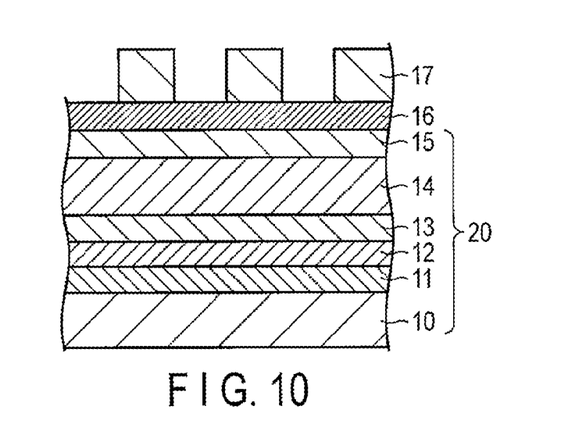
FIG. 10 is an exemplary sectional view showing a manufacturing step of the perpendicular magnetic recording medium according to the embodiment.

Then, the patterned resists were used as masks to etch the C mask layer 17 for an etching time of 10 sec by the ICP-RIE apparatus by using $O_2$ as a process gas at a chamber pressure of 0.1 Pa, a coil RF power of 100 W, and a platen RF power of 50 W, thereby transferring the three-dimensional patterns. Consequently, as shown in FIG. 10, C mask layers 17 having projections corresponding to the BPM three-dimensional patterns were formed, and the surface of the Mo release layer 16 was exposed to recesses between the projections.

Figure 11:
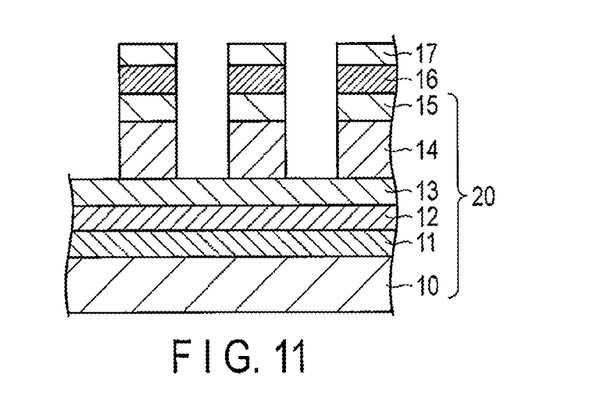
FIG. 11 is an exemplary sectional view showing a manufacturing step of the perpendicular magnetic recording medium according to the embodiment.

Subsequently, as shown in FIG. 11, the patterned C mask layers 17 were used as masks to etch the Mo release layer 16, DLC protective layer 15, and magnetic layer 14 for an etching time of 30 sec by an ion milling apparatus by using Ar gas at a gas pressure of 0.06 Pa and an acceleration voltage of 400 V, thereby transferring the patterns.

Figure 12:
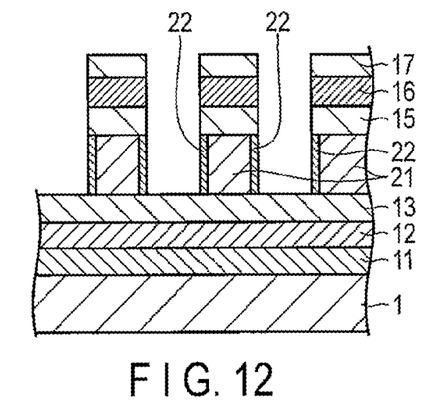
FIG. 12 is an exemplary sectional view showing a manufacturing step of the perpendicular magnetic recording medium according to the embodiment.

Then, the medium was heated to 150° C. and exposed to a 0.5-Pa oxygen ambient for 60 sec, thereby oxidizing the side surfaces of the magnetic layers 14. Consequently, oxide layers 22 were formed on the sidewalls of the magnetic layers 14. Unoxidized regions formed magnetic layers 21.

Figure 13:
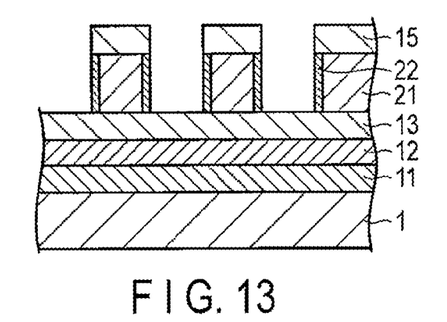
FIG. 13 is an exemplary sectional view showing a manufacturing step of the perpendicular magnetic recording medium according to the embodiment.

The Mo release layers 16 were dissolved by dipping the medium in a 10% hydrogen peroxide solution and holding the medium in the solution for 1 min, thereby entirely removing the Mo release layers 16 and C mask layers 17 remaining above the DLC protective layers 15, as shown in FIG. 13.

Figure 14:
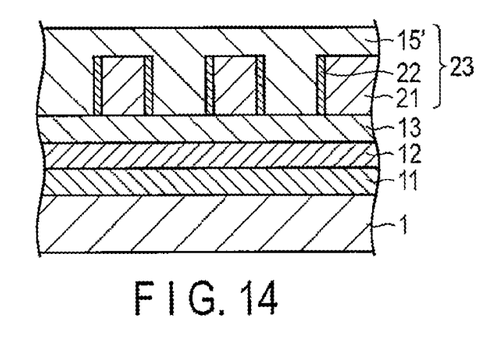
FIG. 14 is an exemplary sectional view showing a manufacturing step of the perpendicular magnetic recording medium according to the embodiment.

Then, DLC was deposited to fill the recesses between the oxide layers 22 by CVD, thereby forming a 30-nm thick nonmagnetic layer 15' integrated with the protective layer 15. As shown in FIG. 14, planarization was thus performed to obtain a patterned perpendicular magnetic recording layer 23 including the protective film 15.

After that, the patterned perpendicular magnetic recording medium according to the embodiment was obtained by coating the medium with a lubricant (not shown) by dipping.

Examples 2-14 & Comparative Examples 1-23

Perpendicular magnetic recording media of Examples 2 to 14 and Comparative Examples 1 to 23 were obtained by changing the composition of the magnetic layer to be formed by sputtering, the presence/absence of the oxidation process, the additive component content after the oxidation process, and the materials (C, $SiO_2$, $TiO_2$, and Ti) to be used in the nonmagnetic layer as described in Table 1 below.

Note that the process of forming the oxide layers as shown in FIG. 12 was omitted for the media of the comparative examples. The magnetostatic characteristics, the element composition distributions in the sectional direction, and the recording/reproduction characteristics of Examples 1 to 14 and Comparative Examples 1 to 23 were measured. Table 1 below show the obtained results.

The magnetostatic characteristics were evaluated by measuring saturation magnetization Ms (emu/cc) by using a vibrating sample magnetometer (VSM) available from Riken Denshi. Note that the Ms herein used is not the Ms of the recording dots (recording portions), but the average Ms of the whole perpendicular magnetic recording layer.

The recording/reproduction characteristics were evaluated by measuring the signal-to-noise ratio (SNR) by matching the recording frequency with the pitch period of the recording dots, by using a head including a shielded magnetic pole as a single pole having a shield (a shield has a function of converging a magnetic flux generated from a magnetic head) for write, and a TMR element as a reproduction unit.

TABLE 1

| | | Magnetic layer composition (before oxidation process) | Oxidation process | Addtive component content (%) (recording portion; after oxidation process | Nonmagnetic layer | Ms (emu/cc) | SNR (dB) |
|---|---|---|---|---|---|---|---|
| Example | 1 | Co—20% Pt—10% Ti | Performed | 3 | C | 425 | 18.4 |
| | 2 | Co—20% Pt—10% Si | Performed | 3 | C | 420 | 18.1 |
| | 3 | Co—20% Pt—10% Al | Performed | 3 | C | 415 | 17.6 |
| | 4 | Co—20% Pt—10% W | Performed | 4 | C | 410 | 17.1 |
| | 5 | Fe—20% Pt—10% Ti | Performed | 4 | C | 520 | 18.1 |
| | 6 | Fe—20% Pt—10% Si | Performed | 4 | C | 515 | 17.9 |
| | 7 | Fe—20% Pt—10% Al | Performed | 4 | C | 510 | 17.7 |
| | 8 | Fe—20% Pt—10% W | Performed | 5 | C | 505 | 17.6 |
| | 9 | Co—20% Pt—10% Ti | Performed | 3 | $SiO_2$ | 425 | 18.4 |
| | 10 | Co—20% Pt—10% Ti | Performed | 3 | $TiO_2$ | 425 | 18.4 |
| | 11 | Co—20% Pt—10% Ti | Performed | 3 | Ti | 425 | 18.4 |
| | 12 | Fe—20% Pt—10% Ti | Performed | 4 | $SiO_2$ | 520 | 18.1 |
| | 13 | Fe—20% Pt—10% Ti | Performed | 4 | $TiO_2$ | 520 | 18.1 |
| | 14 | Fe—20% Pt—10% Ti | Performed | 4 | Ti | 520 | 18.1 |
| Comparative Example | 1 | Co—20% Pt—10% Ti | Notperformed | 8 | C | 220 | 11.8 |
| | 2 | Co—20% Pt—10% Si | Notperformed | 8 | C | 215 | 11.6 |
| | 3 | Co—20% Pt—10% Al | Notperformed | 8 | C | 205 | 11.3 |
| | 4 | Co—20% Pt—10% W | Notperformed | 9 | C | 200 | 11.1 |
| | 5 | Fe—20% Pt—10% Ti | Notperformed | 9 | C | 260 | 10.9 |
| | 6 | Fe—20% Pt—10% Si | Notperformed | 9 | C | 255 | 10.7 |
| | 7 | Fe—20% Pt—10% Al | Notperformed | 9 | C | 250 | 10.5 |
| | 8 | Fe—20% Pt—10% W | Notperformed | 10 | C | 245 | 10.3 |
| | 9 | Co—20% Pt—10% Ti | Notperformed | 8 | $SiO_2$ | 220 | 11.8 |
| | 10 | Co—20% Pt—10% Ti | Notperformed | 8 | $TiO_2$ | 220 | 11.8 |
| | 11 | Co—20% Pt—10% Ti | Notperformed | 8 | Ti | 205 | 11.5 |
| | 12 | Co—20% Pt | Notperformed | — | C | 150 | 9.2 |
| | 13 | Co—20% Pt | Notperformed | — | $SiO_2$ | 150 | 9.2 |
| | 14 | Co—20% Pt | Notperformed | — | $TiO_2$ | 150 | 9.2 |
| | 15 | Co—20% Pt | Notperformed | — | Ti | 120 | 8.9 |
| | 16 | Fe—20% Pt | Notperformed | — | C | 180 | 8.8 |
| | 17 | Fe—20% Pt | Notperformed | — | $SiO_2$ | 180 | 8.8 |
| | 18 | Fe—20% Pt | Notperformed | — | $TiO_2$ | 180 | 8.8 |
| | 19 | Fe—20% Pt | Notperformed | — | Ti | 150 | 8.8 |
| | 20 | Co—20% Pt—10% $SiO_2$ | Notperformed | 10 | C | 100 | 6.1 |
| | 21 | Co—15% Cr—20% Pt—10% $SiO_2$ | Notperformed | 13(Cr), 10($SiO_2$) | C | 90 | 5.5 |
| | 22 | Fe—20% Pt—10% $SiO_2$ | Notperformed | 10 | C | 120 | 4.7 |
| | 23 | Fe—15% Cr—20% Pt—10% $SiO_2$ | Notperformed | 14(Cr), 10($SiO_2$) | C | 110 | 4.2 |

Note that all % represent at % in Table 1.

Table 1 reveal that the Ms values of the media of Examples 1 to 4 were about 420 (emu/cc), whereas those of the media of Comparative Examples 1 to 4 were about 210 (emu/cc), i.e., about half those of Examples 1 to 4. Likewise, while the Ms values of the media of Examples 5 to 8 were about 510 (emu/cc), those of the media of Comparative Examples 5 to 8 were about 250 (emu/cc), i.e., about half those of Examples 5 to 8. The results of the media of Comparative Examples 1 to 8 indicate that the Ms of the film decreased when only at least one element selected from Ti, Si, Al, and W was added to the recording layer. On the other hand, the results of the media of Examples 1 to 8 show that the additive component deposited from the magnetic layer and increased the Ms because the oxidation process was performed.

The Ms of the media of Examples 9 to 11 was 425 (emu/cc), i.e., the same as that of Example 1, and the Ms of the media of Examples 12 to 14 was 520 (emu/cc), i.e., the same as that of Example 5. Also, the values of the recording/reproduction characteristics remained unchanged, indicating that each medium was independent of the filling material (nonmagnetic layer). On the other hand, although the Ms values of the media of Comparative Examples 9 to 11 were about 220 (emu/cc), only the Ms of Comparative Example 11 slightly reduced. This is so probably because a portion of the filling material (Ti) diffused into the recording portions (recording dots) and the Ms reduced because no oxide layer existed. The Ms values of the media of Comparative Examples 12 to 15 were 120 to 150 (emu/cc), and those of the media of Comparative Examples 16 to 19 were 150 to 180 (emu/cc). That is, the Ms values of these media largely reduced. This is so perhaps because when removing the release layer, the oxidizing action of the release solution directly oxidized Co or Fe dominating the Ms in the magnetic layer (recording dots), thereby reducing the Ms. In the media of Comparative Examples 20 to 23, the Ms further reduced and the magnetic characteristics worsened because $SiO_2$ or Cr was used as the additive component.

Next, the element composition distributions before and after the oxidation process was performed on these media were measured using a transmission electron microscope (TEM) in the substrate sectional direction and energy dispersive X-ray spectroscopy (TEM-EDX). Consequently, 1- to 3-nm thick oxide layers were formed to cover the side surfaces of the recording portions in the media of Examples 1 to 14. When the element distributions were checked by TEX-EDX, it was found that the additive components such as Ti, Si, Al, and W oxidized and covered the recording portions as oxide layers. Also, the concentrations of the additive components (Ti, Si, Al, and W) in the unoxidized magnetic layers (recording dots) except for the oxide layers reduced to about 3 to 5 at %.

On the other hand, in the media of Comparative Examples 1 to 11, mixtures mainly containing oxides such as Co and Fe and partially containing oxides of added Ti, Si, Al, and W nonuniformly distributed with thicknesses of about 2 to 4 nm around the unoxidized magnetic layers. Also, the concentrations of the additive components (Ti, Si, Al, and W) in the unoxidized magnetic layers (recording dots) except for the oxide layers reduced to about 8 to 10 at %. In the media Comparative Examples 12 to 23, oxide layers of Co and Fe nonuniformly distributed with thicknesses of about 2 to 4 nm around the unoxidized magnetic layers (recording dots).

Finally, the recording/reproduction characteristics of these media were evaluated by measuring the electromagnetic conversion characteristics by using read/write analyzer RWA1632 and spinstand S1701MP available from GUZIK, U.S.A. The recording/reproduction characteristics were evaluated by measuring the signal-to-noise ratio (SNR) by matching the recording frequency with the pitch period of the recording dots, by using a head including a shielded magnetic pole as a single magnetic pole having a shield (a shield has a function of converging a magnetic flux generated from a magnetic head) for write, and a TMR element as a reproduction unit. As shown in Table 1, the media of Examples 1 to 14 had high SNRs. On the other hand, the characteristics of the media of Comparative Examples 1 to 23 deteriorated compared to the media of the examples of this application. This is so presumably because when removing the release layers by using a hydrogen peroxide solution, Co and Fe in the magnetic layers oxidized, and this reduced magnetization and weakened signals. Furthermore, since Co and Fe probably nonuniformly oxidized, the magnetocrystalline anisotropy also reduced, and the thermal decay resistance decreased.

In the present invention, an oxygen exposure method performed under heating is taken as an example of the oxidation process. However, the same effect can be obtained by forming oxide layers by using reactive oxygen such as ozone, using oxygen plasma processing or an oxygen asking step, or by using another process such as dipping into nitric acid.

When using the media according to the examples, oxide layers are formed around magnetic layers as recording portions. This prevents oxidation damage to Co or Fe when removing the release layer.

Examples 15 & 16 & Comparative Examples 24 & 25

Perpendicular magnetic recording media of Examples 15 and 16 and Comparative Examples 24 and 25 were obtained following the same procedure as in Example 1 except that the release layer and release solution to be used were changed as shown in Table 2 below. Table 2 also shows the composition of the magnetic layer to be formed by sputtering, the presence/absence of the oxidation process, and the additive component content after the oxidation process.

First, after a 2-nm thick DLC protective layer was formed, a 5-nm thick Al film was formed as a release layer, a 30-nm thick C film was formed as a mask layer, and this C mask layer was spin-coated with a 50-nm thick SOG resist. When removing the Al release layer, the medium was dipped in an aqueous 1% sodium hydroxide solution and held in it for 3 min, thereby removing the Al release layer and all the films on it. Note that the process of forming oxide layers as shown in FIG. 12 was not performed on the media of the comparative examples.

The magnetostatic characteristics and recording/reproduction characteristics of these media were measured in the same manner as in Example 1. Table 2 below shows the obtained results.

TABLE 2

| | | Magnetic layer composition (before oxidation process) | Release layer | Oxidation process | Addtive component content (%) (recording portion; after oxidation process) | Release solution (processing time) | Ms (emu/cc) | SNR (dB) |
|---|---|---|---|---|---|---|---|---|
| Example | 15 | Co—20% Pt—10% Ti | Al | Performed | 3 | 1% NaOH (3 min) | 425 | 18.4 |
| | 16 | Fe—20% Pt—10% Ti | Al | Performed | 4 | 1% NaOH (3 min) | 520 | 18.1 |
| Comparative | 24 | Co—20% Pt—10% Ti | Al | Notperformed | 8 | 1% NaOH (3 min) | 250 | 11.9 |
| Example | 25 | Fe—20% Pt—10% Ti | Al | Notperformed | 4 | 1% NaOH (3 min) | 280 | 11.0 |

Note that all % represent at % in Table 2.

As shown in Table 2, the media of Examples 15 and 16 were superior in Ms and SNR to those of Comparative Examples 24 and 25. This reveals that when using the media according to the examples, the films of an oxide were formed around the unoxidized magnetic layers as recording portions, so the interiors of the recording portions were protected against damage during removal. On the other hand, in the media of Comparative Examples 24 and 25 in which no oxide layers existed, when removing the release layer with NaOH, Co or Fe formed a hydroxide and deposited or eluted, thereby damaging the recording portions (recording dots).

Examples 17-20 & Comparative Examples 26-28

Perpendicular magnetic recording media of Examples 17 to 20 and Comparative Examples 26 to 28 were obtained following the same procedure as in Example 1 except that the Ti contents of the magnetic layers before the oxidation process were changed from 0 to 30 at % as shown in Table 3 below. Table 3 also shows the Ti contents after the oxidation process.

The magnetostatic characteristics, recording/reproduction characteristics, and uniaxial magnetocrystalline anisotropy constants (Ku) of these media were measured in the same manner as in Example 1. Table 3 below shows the obtained results.

The Ku was measured using a torque magnetometer (TRT-2-15 available from TOEI INDUSTRY).

TABLE 3

|  |  | Ti content (%) | Ti content after oxidation process (%) | Ms (emu/cc) | Ku (erg/cc) | SNR (dB) |
|---|---|---|---|---|---|---|
| Example | 17 | 5 | 0 | 400 | $11 \times 10^{-6}$ | 18.0 |
|  | 18 | 10 | 3 | 425 | $10 \times 10^{-6}$ | 18.4 |
|  | 19 | 15 | 8 | 410 | $8 \times 10^{-6}$ | 18.3 |
|  | 20 | 20 | 13 | 400 | $7 \times 10^{-6}$ | 18.0 |
| Comparative | 26 | 25 | 18 | 350 | $1 \times 10^{-6}$ | 11.7 |
| Example | 27 | 30 | 23 | 300 | $0.9 \times 10^{-6}$ | 11.0 |
|  | 28 | 0 | — | 190 | $5 \times 10^{-6}$ | 9.8 |

Note that all % represent at % in Table 3.

As shown in Table 3, when the addition amount of Ti was increased, the Ms peaked at 10 at % and gradually reduced. When the addition amount was up to about 20 at %, most Ti in the recording portions (recording dots) deposited, so a high Ms was maintained. When the addition amount was 5 at %, Co was partially damaged because the amount of Ti was slightly deficient. On the other hand, when the addition amount was 25 at % or more, this Ti addition amount was too large, so it was presumably possible to form oxide films by only Ti near the surface, and Ti in the recording portions (recording dots) did not completely deposit and remained. This disturbed the crystal alignment, and significantly reduced the uniaxial magnetocrystalline anisotropy constant Ku. When no Ti was contained, both the Ms and Ku reduced. This is so probably because when performing the oxidation process, no material for forming oxide layers existed except for Co, so Co itself in the magnetic layers perhaps oxidized and suffered damage. Table 3 reveals that the media of Examples 17 to 20 were superior in SNR to those of Comparative Examples 26 to 28.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A perpendicular magnetic recording medium manufacturing method comprising:
    forming a mask layer comprising projections having regularly arranged patterns on a surface of a perpendicular magnetic recording medium, the perpendicular magnetic recording medium comprising a substrate and a magnetic layer, the magnetic layer consisting of (1) a main component of (i) platinum and (ii) iron or cobalt and (2) an additive element of titanium, silicon, aluminum, or tungsten;
    etching through the mask layer to form regularly arranged patterns in the magnetic layer;
    forming oxide layers by oxidizing side surfaces of the regularly arranged patterns in the magnetic layer, the oxide layers being made of a first material, the first material being an oxide of the at least one additive element;
    removing the mask layer; and
    performing planarization to form nonmagnetic layers between the oxide layers, the nonmagnetic layers being made of a second material different from the first material, the second material being carbon, titanium, $SiO_2$, or $TiO_2$.

2. The method of claim 1, wherein the additive element comprises titanium, and the first material is titanium oxide.

3. The method of claim 1, wherein a content of the additive element comprises 5 to 20 at % of a composition of the magnetic layer.

4. The method according to claim 1, further comprising forming a release layer on the surface of a perpendicular magnetic recording medium before forming the mask layer, etching through the release layer before forming the regularly arranged patterns in the magnetic layer, and removing the release layer together when removing the mask layer.

5. The method according to claim 4, further comprising forming a protective layer on the surface of a perpendicular magnetic recording medium before forming the release layer, and forming the nonmagnetic layers integrated with the protective layer when performing planarization.

* * * * *